Patented June 15, 1954

2,681,349

UNITED STATES PATENT OFFICE 2,681,349

PREPARATION OF 5-METHYL-2-PYRROLIDONE

Andrew P. Dunlop, Riverside, and Edward Sherman, Chicago, Ill., assignors to The Quaker Oats Company, Chicago, Ill., a corporation of New Jersey No Drawing. Application March 11, 1952, Serial No. 276,048

14 Claims. (Cl. 260—326.5)

This invention relates to the preparation of 5-methyl-2-pyrrolidone by a one step reductive-amination of levulinic acid.

We have discovered that by the hydrogenation of levulinic acid in an aqueous or an alcoholic medium under ammoniacal conditions and in the presence of a hydrogenation catalyst, 5-methyl-2-pyrrolidone can be obtained according to the following general equation:

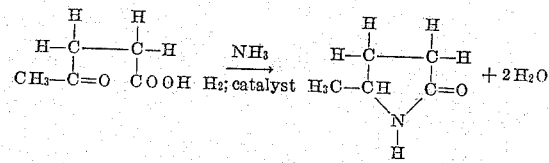

Several methods have been suggested in the prior art as possible methods for the production of 5-methyl-2-pyrrolidone, all, however, possess certain disadvantages in that intermediate compounds must first be prepared thus the process involves several steps or a mixture of compounds is prepared. As specific examples, Tafel, Ber., 19, 2415 (1886); 22, 1860 (1889) prepared this product by the cyclodehydration of γ-aminovaleric acid. Winans and Adkins, J. Am. Chem. Soc., 55, 4167 (1933) prepared this same compound by the catalytic reduction of the oxime of ethyl levulinate. Spath and Lintner, Ber., 69B, 2727 (1936) employed a process involving the amination of γ-valerolactone with $ZnCl_2 \cdot 6NH_3$. Hoffmann-La Roche and Company, German Patent 609,244 (Jan. 24, 1935) disclose a process for the preparation of this pyrrolidone together with 1,5-dimethyl-2-pyrrolidone by the reductive amination of a mixture of formalin, ammonium hydroxide and levulinic acid.

It is an object of the present invention to provide an efficient process for the preparation of 5-methyl-2-pyrrolidone which obviates the disadvantages of the prior art. Another object is to provide a process for the preparation of 5-methyl-2-pyrrolidone in a direct manner which can be easily carried out using relatively inexpensive equipment. Another object is to provide a process for the preparation of 5-methyl-2-pyrrolidone from levulinic acid by a one step reductive amination method. A very important object is to provide an improved process for producing 5-methyl-2-pyrrolidone by the reductive amination of levulinic acid. Other objects and advantages of the present invention will become apparent to those skilled in the art as the invention is more fully described.

Broadly stated the present invention provides a process for the production of 5-methyl-2-pyrrolidone which comprises hydrogenating an aqueous or an alcoholic solution of levulinic acid in the presence of a hydrogenation catalyst and ammonia at elevated temperatures as for example 100–300° C. and under super-atmospheric pressures. Although any of the hydrogenation catalysts listed by Adams, "Organic Reactions" vol. IV, pp. 174–255 (1948) are suitable, we prefer the base metal catalysts particularly nickel and cobalt. In respect to the alcoholic solvent we prefer, for practical reasons, the lower aliphatic alcohols, however, almost any saturated alcohol may be used. Briefly, the levulinic acid is hydrogenated in the presence of one to ten times the required amount of ammonia and the hydrogenation catalyst for one to four hours at elevated temperatures after which the methyl-pyrrolidone is recovered directly by vacuum distillation after removal of excess ammonia and water or alcohol depending upon the particular medium used. In view of the fact that the conditions, temperature, pressure, type and quantity of catalyst used, quantity of ammonia used, as well as degree of agitation are all interdependent variables the actual operating conditions vary widely. Generally, we prefer to operate within a temperature range of 150–275° C. and under a pressure of about 500–3000 p. s. i. g.

In order to describe the nature of the present invention still more thoroughly, the following illustrations or examples will be given in which "parts by weight" bear the same relation to "parts by volume" as grams do to cubic centimeters. The Raney nickel catalysts W–5 and W–7 were prepared following the directions given in Organic Syntheses, 29, 24 (1949). A measured volume of the catalyst which had settled from a suspension in ethanol was used in Examples 1–5 inclusive. The catalysts used in Examples 6 and 7 were prepared by reducing nickel and cobalt on kieselguhr in the presence of hydrogen.

Example 1

Twelve parts by weight of levulinic acid, 100 parts by volume of anhydrous methanol saturated with ammonia at 0° C. and 1 part by volume of a W–5 Raney nickel catalyst settled from a suspension in ethanol were added to a hydrogenation bomb at 0° C. Hydrogen was added to a pressure of 1000 p. s. i. g., the mixture was then heated with agitation until the temperature reached 240–260° C. (1 hour) and maintained within that range for an additional 3¼ hours. The bomb was then cooled, vented, and its contents removed. After removing the catalyst by filtration and the methanol and formed water by distillation at atmospheric pressure 5.4 parts by weight (54% of theory) of 5-methyl-2-pyrrolidone boiling at 90-97° C. at a pressure of 0.5 mm. was obtained by distilling the residue under reduced pressure.

*Example 2*

One hundred twenty parts by weight of levulinic acid, 68 parts by volume of ammonium hydroxide (28% ammonia) and 5 parts by volume of a W-5 Raney nickel catalyst in ethanol were added to a hydrogenation bomb. Hydrogen was added to a pressure of 1625 p. s. i. g., the mixture was then heated with agitation until the temperature reached 260-270° C. (1 hour) and maintained within that range for an additional 4¼ hours. The bomb was then cooled, vented and its contents removed. After removing the catalyst by filtration and the water by distillation under a pressure of 75-85 mm. of mercury 64.1 parts by weight of 5-methyl-2-pyrrolidone boiling at 100° C. at a pressure of 2.5 mm. of mercury was obtained by distilling the residue under reduced pressure.

*Example 3*

Eighty parts by weight of levulinic acid, 135 parts by volume of ammonium hydroxide (28% ammonia) and 3 parts by volume of a W-7 Raney nickel catalyst in ethanol were added to a hydrogenation bomb. Hydrogen was added to a pressure of 1800 p. s. i. g., the mixture was then heated with agitation until the temperature reached 150° C. (2¾ hours) and maintained at that point for an additional ¼ hour. Because hydrogen uptake was low the bomb was cooled, vented and 3 parts by volume of a W-5 Raney nickel catalyst in ethanol and 35 parts of ammonium hydroxide (28% ammonia) added. Hydrogen was added to a pressure of 1750 p. s. i. g., the mixture was then heated with agitation until the temperature reached 265-275° C. (1 hour) and maintained within that range for an additional 1¾ hours. The bomb was cooled, vented and the contents worked up as in Example 2. Yield 47.1 parts by weight (72% of theory) of 5-methyl-2-pyrrolidone boiling at 98-99° C. at a pressure of 2.5 mm. of mercury.

*Example 4*

Two hundred forty parts by weight of levulinic acid, 135 parts by volume of ammonium hydroxide (28% ammonia), 68 parts by weight of liquid ammonia, and 10 parts by volume of a W-5 Raney nickel catalyst in ethanol were added to the hydrogenation bomb. Hydrogen was added to a pressure of 1625 p. s. i. g., the mixture was then heated with agitation until the temperature reached 245-255° C. (1½ hours) and maintained within that range for an additional ¾ hour. The bomb was cooled, vented and the contents worked up as in Example 2. Yield 147.7 parts by weight (75% of theory) of 5-methyl-2-pyrrolidone boiling at 92-93° C. at a pressure of 1.2-1.3 mm. of mercury.

*Example 5*

Sixty parts by weight of levulinic acid, 45 parts by volume of ammonium hydroxide (28% ammonia), 74 parts by weight of liquid ammonia and 5 parts by volume of a W-5 Raney nickel catalyst in ethanol were added to a hydrogenation bomb. Hydrogen was added to a pressure of 1600 p. s. i. g., the mixture was then heated with agitation until the temperature reached 150-160° C. (½ hour) and maintained within that range for an additional 4½ hours. The bomb was then cooled in a "Dry-Ice"-acetone bath, vented and the contents worked up as in Example 2. Yield 27 parts by weight (55% of theory) of 5-methyl-2-pyrrolidone boiling at 108° C. at a pressure of 4.5 mm. of mercury.

*Example 6*

Forty parts by weight of levulinic acid, 45 parts by volume of ammonium hydroxide (28% ammonia) and 10 parts by weight of a nickel catalyst on kieselguhr were added to a hydrogenation bomb. Hydrogen was added to a pressure of 1850 p. s. i. g., the mixture was then heated with agitation until the temperature reached 260-265° C. (1 hour) and maintained within that range for an additional 3 hours. The bomb was cooled, vented, and the contents worked up as in Example 2. Yield 25.3 parts by weight (77% of theory) of 5-methyl-2-pyrrolidone boiling at 102-103° C. at a pressure of 3.5 mm. of mercury.

*Example 7*

Forty parts by weight of levulinic acid, 45 parts by volume of ammonium hydroxide (28% ammonia) and 10 parts by weight of a cobalt catalyst on kieselguhr were added to a hydrogenation bomb. Hydrogen was added to a pressure of 1850 p. s. i. g., the mixture was then heated with agitation until the temperature reached 255-260° C. (1 hour) and maintained within that range for an additional 1.5 hours. The bomb was cooled, vented, and the contents worked up as in Example 2. Yield 23.3 parts by weight (71% of theory) of 5-methyl-2-pyrrolidone boiling at 102-105° C. at a pressure of 4-5 mm. of mercury.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

We claim:

1. A process for preparing 5-methyl-2-pyrrolidone which comprises reacting hydrogen and ammonia with levulinic acid in a molar ratio of ammonia to levulinic acid of at least 1 to 1 under a pressure of 500-3000 p. s. i. g. and a temperature of 100-300° C. in the presence of a hydrogenation catalyst selected from the group consisting of cobalt and nickel and a solvent selected from the group consisting of water and a saturated aliphatic alcohol containing not more than 4 carbon atoms.

2. A process for preparing 5-methyl-2-pyrrolidone which comprises reacting hydrogen and ammonia with levulinic acid in a molar ratio of ammonia to levulinic acid of at least 1 to 1 under a pressure of 500-3000 p. s. i. g., and a temperature of 100-300° C. in the presence of a nickel catalyst and a solvent selected from the group consisting of water and a saturated aliphatic alcohol containing not more than 4 carbon atoms.

3. A process for preparing 5-methyl-2-pyrrolidone which comprises reacting hydrogen and ammonia with levulinic acid in a molar ratio of ammonia to levulinic acid of at least 1 to 1 under a pressure of 500-3000 p. s. i. g. and a temperature of 100-300° C. in the presence of a cobalt catalyst and a solvent selected from the group consisting of water and a saturated aliphatic alcohol containing not more than 4 carbon atoms.

4. The process of claim 1 wherein the solvent is water.

5. The process of claim 2 wherein the solvent is water.

6. The process of claim 3 wherein the solvent is water.

7. The process of claim 1 wherein the solvent is a saturated aliphatic alcohol containing not more than 4 carbon atoms.

8. A process for preparing 5-methyl-2-pyrrolidone which comprises reacting hydrogen and ammonia with levulinic acid in a molar ratio of ammonia to levulinic acid of at least 1 to 1 under a pressure of 500–3000 p. s. i. g. and a temperature of 100–300° C. in the presence of a nickel catalyst and a saturated aliphatic alcohol containing not more than 4 carbon atoms.

9. A process for preparing 5-methyl-2-pyrrolidone which comprises reacting hydrogen and ammonia with levulinic acid in a molar ratio of ammonia to levulinic acid of at least 1 to 1 under a pressure of 500–3000 p. s. i. g. and a temperature of 100–300° C. in the presence of a cobalt catalyst and a saturated aliphatic alcohol containing not more than 4 carbon atoms.

10. A process for preparing 5-methyl-2-pyrrolidone which comprises reacting hydrogen and ammonia with levulinic acid in a molar ratio of ammonia to levulinic acid of at least 1 to 1 under a pressure of 500–3000 p. s. i. g. and a temperature of 150–275° C. in the presence of a hydrogenation catalyst selected from the group consisting of cobalt and nickel and a solvent selected from the group consisting of water and a saturated aliphatic alcohol containing not more than 4 carbon atoms.

11. A process for preparing 5-methyl-2-pyrrolidone which comprises reacting hydrogen and ammonia with levulinic acid in a molar ratio of ammonia to levulinic acid of at least 1 to 1 under a pressure of 500–3000 p. s. i. g. and a temperature of 150–275° C. in the presence of a nickel catalyst and a solvent selected from the group consisting of water and a saturated aliphatic alcohol containing not more than 4 carbon atoms.

12. A process for preparing 5-methyl-2-pyrrolidone which comprises reacting hydrogen and ammonia with levulinic acid in a molar ratio of ammonia to levulinic acid of at least 1 to 1 under a pressure of 500–3000 p. s. i. g. and a temperature of 150–275° C. in the presence of a cobalt catalyst and a solvent selected from the group consisting of water and a saturated aliphatic alcohol containing not more than 4 carbon atoms.

13. The process of claim 10 wherein the solvent is water.

14. The process of claim 11 wherein the solvent is water.

No references cited.